US010090963B2

(12) United States Patent
Seyedi-Esfahani et al.

(10) Patent No.: US 10,090,963 B2
(45) Date of Patent: Oct. 2, 2018

(54) SYSTEM, APPARATUS, AND METHOD FOR SINGLE-CARRIER BLOCK TRANSMISSION WITH ADAPTIVE GUARD INTERVAL

(75) Inventors: Seyed-Alireza Seyedi-Esfahani, Peekskill, NY (US); Vasanth Gaddam, Tarrytown, NY (US); Dagnachew Birru, Yorktownheights, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1261 days.

(21) Appl. No.: 12/096,626

(22) PCT Filed: Dec. 5, 2006

(86) PCT No.: PCT/IB2006/054615
§ 371 (c)(1),
(2), (4) Date: Jun. 9, 2008

(87) PCT Pub. No.: WO2007/066293
PCT Pub. Date: Jun. 14, 2007

(65) Prior Publication Data
US 2008/0310519 A1    Dec. 18, 2008

Related U.S. Application Data

(60) Provisional application No. 60/748,674, filed on Dec. 8, 2005.

(51) Int. Cl.
*H04L 1/00* (2006.01)
*H04L 1/16* (2006.01)
*H04L 27/26* (2006.01)

(52) U.S. Cl.
CPC .......... *H04L 1/0006* (2013.01); *H04L 1/0025* (2013.01); *H04L 1/1671* (2013.01); *H04L 27/2607* (2013.01)

(58) Field of Classification Search
CPC ... H04L 1/0005; H04L 1/0025; H04L 1/1671; H04L 5/0048
(Continued)

(56) References Cited

U.S. PATENT DOCUMENTS

2004/0013084 A1    1/2004  Thoams
2004/0218522 A1   11/2004  Sundstrom
(Continued)

FOREIGN PATENT DOCUMENTS

EP         1531593 A2    11/2004

OTHER PUBLICATIONS

Yue Wang et al., "Cyclis Prefixed Single carrier Transmission in Ultra-Wideband Communication" Communications, 2005, ICC 2005, IEEE International Conference on Seoul, Koria, May 2005, pp. 2862-2866, XP010825724.
(Continued)

*Primary Examiner* — Kabir A Timory
(74) *Attorney, Agent, or Firm* — Larry Liberchuk

(57) ABSTRACT

The system, apparatus and method of the present invention provides a single carrier block transmission with guard interval as a means of communications over multi-path channels that enables frequency domain equalization, and therefore, has many of the advantages of OFDM, but does not have some of the drawbacks such as high PAPR and the need for high resolution ADCs. While the use of guard intervals in single carrier communications enables low complexity detection of the signal, it reduces bandwidth efficiency. The present invention improves the bandwidth efficiency by adjusting the length of the guard interval adaptively. Also, by allowing both time-domain and frequency domain equalizations, besides improving bandwidth efficiency, the inventions allows for great flexibility in receiver design.

8 Claims, 5 Drawing Sheets

(58) Field of Classification Search
USPC .......... 375/219, 260, 299, 348, 346, 349
See application file for complete search history.

(56) References Cited

U.S. PATENT DOCUMENTS

| 2005/0099936 A1* | 5/2005 | Fujii et al. .................. 370/203 |
| 2006/0203932 A1* | 9/2006 | Palanki et al. ............... 375/295 |
| 2006/0209974 A1* | 9/2006 | Yoshida ...................... 375/260 |
| 2007/0036231 A1* | 2/2007 | Ido ............................. 375/260 |

OTHER PUBLICATIONS

K. Hayashi et al., "Per-Tone Equalization for Single Carrier Block Transmission with Cyclic Prefix", Circuits and Systems, 2004, MWSCAS 2004, The 2004 47th Midwest Symposium on Hiroshima, Japan, Jul. 2004, vol. 2, pp. II649-II652, XP010738834.

M. Rim, "Single-Carrier with Frequency-Domain Equalization with Variable-Length Guard Intervals", Journal of the Institute of Electronics Engineers of Korea TC, Apr. 2005, pp. 25, XP002436371 (Abstract).

Z.Y. Zhang et al., "A novel OFDM transmission Scheme with Length-Adaptive Cyclic Prefix", Journal of Zhejiang University Science, Nov. 2004.

K.L. Baum et al., "Cyclic-Prefix CDMA: An Improved transmission Method for Broadband DS-CDMA Cellular Systems", WCNC 2002—IEEE Wireless Communication and Networking Conference, vol. 3, No. 1, Mar. 2002, pp. 150-155.

Z. Wang et al., "OFDM or Single-Carrier Block Transmissions?", IEEE Transactions on Communications, vol. 52, pp. 380-394, Mar. 2004.

\* cited by examiner

SYSTEM, APPARATUS, AND METHOD FOR SINGLE-CARRIER BLOCK TRANSMISSION WITH ADAPTIVE GUARD INTERVAL

The present invention relates to a system, apparatus and method for an adaptive length Guard Interval for Single Carrier Block Transmission in digital communication systems.

In orthogonal frequency division multiplexing (OFDM) systems and other multi-carrier systems as well as in Single Carrier Block Transmission (SCBT), a Guard Interval (GI) is often used before each block. This Guard Interval is either filled with a copy of the end portion of the block, which is known as a Cyclic Prefix (CP), or filled with zeros, which is known as Zero Padding (ZP). If CP is used, at the receiver this portion of the symbol is simply discarded. If ZP is used, the portion of the signal that has spilled into the ZP, due to channel delays, is added to the beginning of the data symbol.

CP and ZP achieve the following important advantages:
  Remove Inter-Symbol Interference (ISI): If the length of CP or ZP is longer than the maximum channel delay, ISI will be avoided.
  Avoid Inter-Carrier Interference (ICI): If CP or ZP is not used, the delayed version of the OFDM tones are truncated. Hence, the OFDM symbol will contain partial cycles of these tones. As a result, the tones are no longer orthogonal and ICI is created.
  Enable Block Processing: When CP or ZP is used, effectively the channel impulse response is circularly convolved with the data (as opposed to a regular convolution). This enables the block processing of the signal.

The primary disadvantage of the use of GI is its bandwidth inefficiency. If the length of the GI is $N_{GI}$ samples, the bandwidth efficiency of the system is reduced by a factor of $N/(N + N_{GI})$, where N is the block length in SCBT systems or the number of sub-carriers in OFDM systems (length of the OFDM block).

Some form of modification of the GI is thus needed to mitigate its impact on bandwidth efficiency so that the positive advantages on CP and ZP can be realized.

The system, apparatus and method of the present invention provide a single-carrier transmission having an adaptive-length GI that makes efficient use of bandwidth. Usually the GI is designed to be longer than the worst-case (longest) channel impulse response. To improve the bandwidth efficiency of the systems, the length of the GI in a Single Carrier system is adapted by the system, apparatus, and method of the present invention according to the actual channel impulse response length.

The SCBT systems with GI have the advantages of OFDM systems in dealing with multi-path, but do not have some of the disadvantages of OFDM systems, namely high Peak to Average Power Ratio (PAPR) and the need for high resolution analog-to-digital conversion (ADC). In terms of performance, the SCBT systems with GI outperform OFDM systems, if a high rate channel code (or no coding) is used.

Figure 1A:
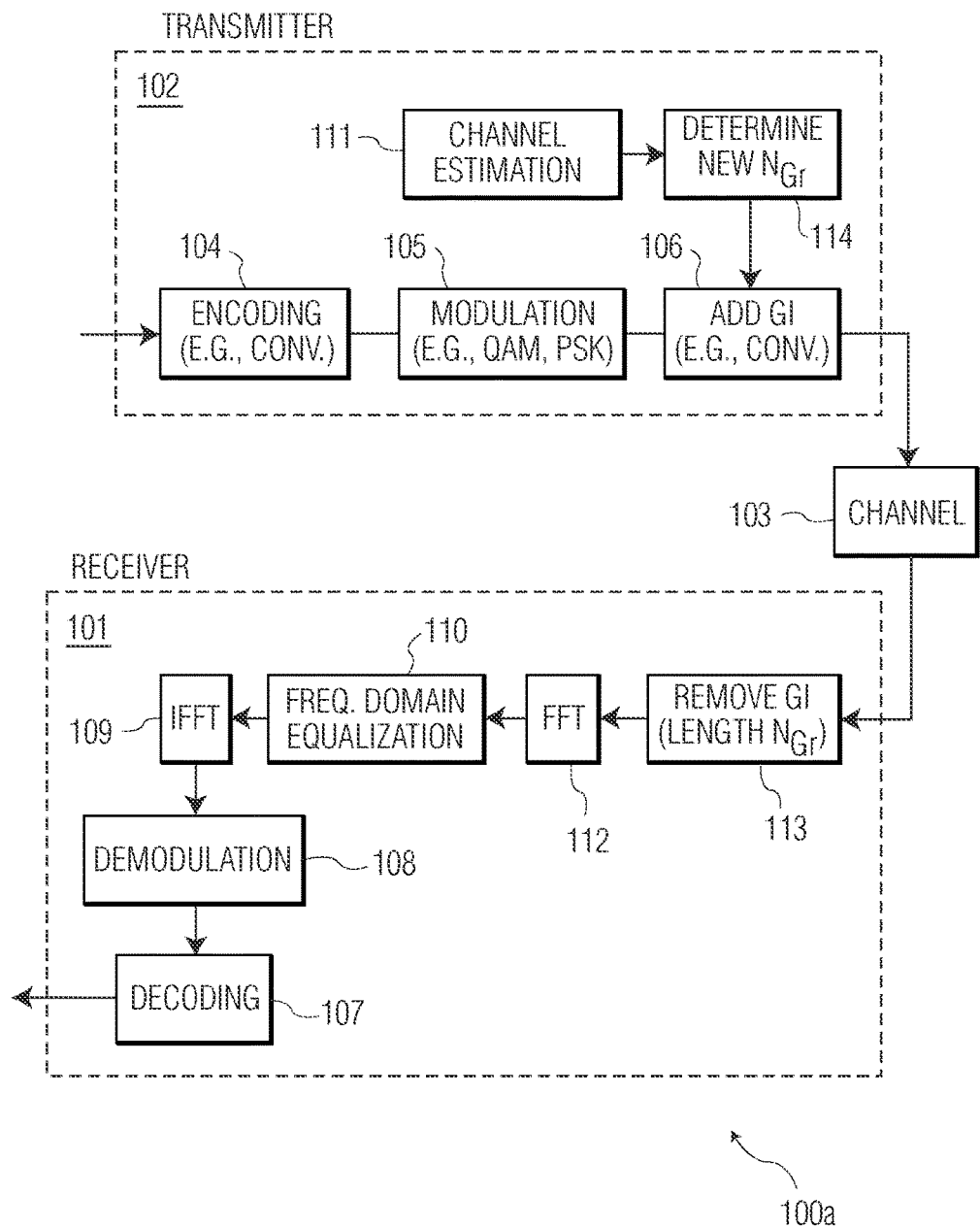
FIG. 1 illustrates a system block diagram of a single carrier block transmission system with adaptive GI.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention. In light of this, only for the purpose of demonstrating the performance of the invention, parameters similar to that of the MB-OFDM UWB system have been used, but one skilled in the art can readily apply these discussions to any SCBT systems.

In a preferred embodiment, an SCBT system with GI is one having a block of symbols (e.g. QAM or PSK) with length N, that is preceded by a CP or ZP. Such a system is equivalent to an OFDM system with full frequency-domain spreading, if an N×N Fourier matrix is used as the spreading (code) matrix. Mathematically, the transmitted signal from a spread OFDM system can be written as $$s = PF^{-1}Cx$$

where x is the N×1 vector of the information symbols, C is the N×N spreading matrix, $F^{-1}$ is the inverse Fourier transform matrix (also N×N). The matrix P creates the GI and is of the size $(N+N_{GI})×N$, where $N_{GI}$ is the length of the GI. For CP the P matrix is $$P = \begin{bmatrix} 0_{N_{GI} \times N - N_{GI}} \mid I_{N_{GI}} \\ \hline I_N \end{bmatrix}$$

and for ZP the P matrix is $$P = \begin{bmatrix} 0_{N_{GI} \times N - N_{GI}} \mid 0_{N_{GI}} \\ \hline I_N \end{bmatrix}$$

It is easy to see that the SCBT system with GI is a special case of the above form if the spreading matrix is the Fourier matrix, i.e. C=F. In this case $$s = Px$$

which means that the simple transmission of the symbol vector x is preceded by a GI.

In a preferred embodiment, the system, apparatus and method of the present invention overcome bandwidth inefficiency. As in OFDM systems, the use of GI introduces bandwidth inefficiency. A preferred embodiment of the present invention allows such an SCBT system to adapt to the highest possible bandwidth efficiency, as a function of the channel impulse response length, while retaining the advantages of the single carrier transmission with GI.

In a preferred embodiment, the system, apparatus and method of the present invention provide flexibility in the use of antenna gain. In systems, where, based on the application requirements, different antennas with different gains are needed, based on the antenna gain (beam-width) used, the system will observe different levels of multipath. Such a system must be flexible to take advantage of flat channels, but at the same time be able to cope with multi-path channels with low complexity. When a very high gain antenna is used, the beam is strongly focused. Hence, very little or no multi-path exists. In this case, a traditional single carrier system is advantageous, due to its low complexity and higher bandwidth efficiency. When a low gain (wide angle) antenna is used, multi-path is unavoidable and therefore, a system with GI and frequency domain equalization can provide good performance with lower complexity.

In a preferred embodiment, the system, apparatus and method of the present invention provide flexibility in receiver design. Typically, in an OFDM or SCBT system with GI, a frequency domain receiver must be used. On the other hand, if a single carrier without GI is used for transmission, a time domain receiver (RAKE receiver) must be used. A preferred embodiment of the present invention provides full flexibility in the design of the receivers.

In a preferred embodiment, the system, apparatus and method of the present invention transmits a block of N symbols (single carrier transmission) followed by an adaptive length GI. The transmitted symbols contain any of coded information data, uncoded information data, known data (pilot symbols) and can be left empty (set equal to zero). Also, in an alternative embodiment, each symbol may be pulse-shaped to result in a desired spectral shape.

In a preferred embodiment the length of the GI is adaptively adjusted according to at least one of the channel impulse response length, and the receiver design capabilities. This can be performed either in an open-loop or in a closed-loop fashion.

Referring now to FIG. 1A, in a preferred embodiment including open-loop, based on the estimate of the channel from the received packets, the transmitter estimates the length of the channel impulse response and sets the GI length accordingly. The length determined for the GI is communicated to the receiver in advance or using a field in the packet header.

Figure 1B:
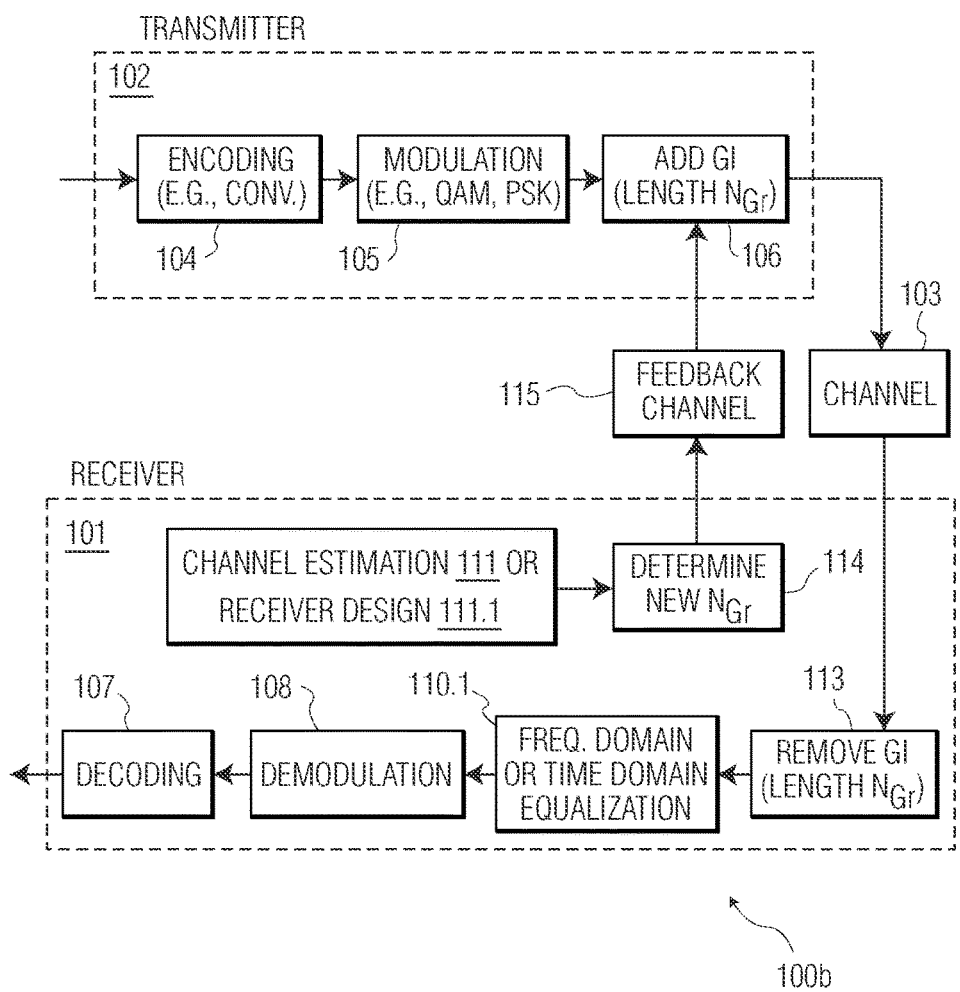

Referring now to FIG. 1B, in a first alternative preferred embodiment including closed-loop, during the link set-up, and periodically after the link has been established, the receiver 101 determines the length of the GI 114 and informs the transmitter 102 of this decision using a field in an ACK or a return packet header. The receiver's decision is based on at least one of the factors selected from the group consisting of its own design 111.1 and the current channel impulse response length based on channel estimation by the receiver 111. For example, a time domain receiver (RAKE receiver) can dictate a GI length of zero. This results in a simple single carrier transmission scheme.

Figure 1C:
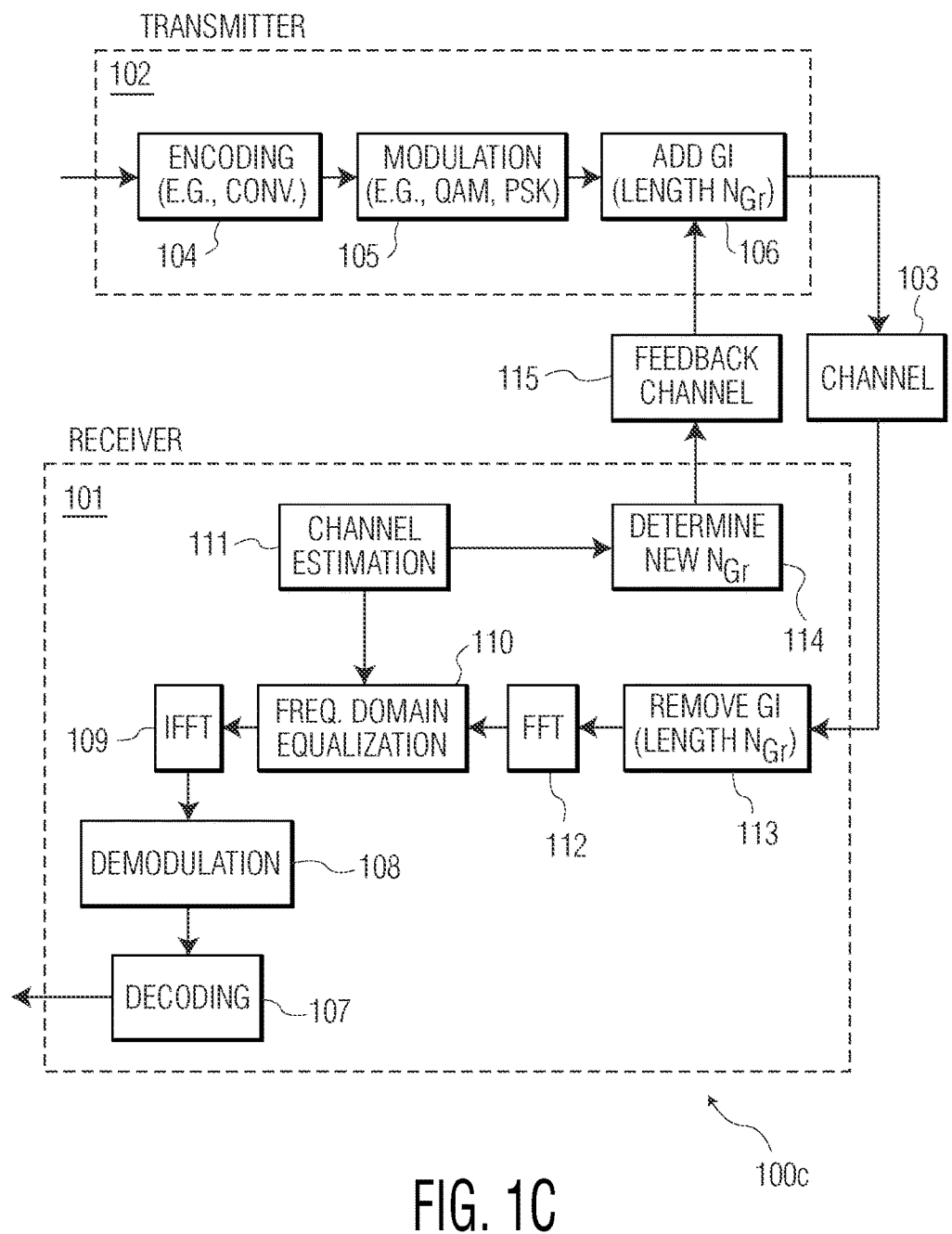

On the other hand, referring now to FIG. 1C, in a second alternative preferred embodiment, a receiver that uses frequency domain equalization 110, chooses the appropriate GI length as a function of the observed channel impulse response length 111. FIG. 1C illustrates the alternative preferred embodiment for closed loop of a system having a frequency domain receiver 101 and a feedback channel 115 that is a separate channel or uses return or ACK packets of the normal communication channel 103. The receiver 101 periodically estimates the channel 111, determines the new GI length $N_{GI}$ 114, and transmits the new GI length $N_{GI}$ to the transmitter 102 over at least one of a feedback channel 115 or in the normal communication channel 103 in return/ACK packets. Thereafter, until a new GI length is received, the transmitter adds the GI of the length $N_{GI}$ before each OFDM symbol.

Figure 2:
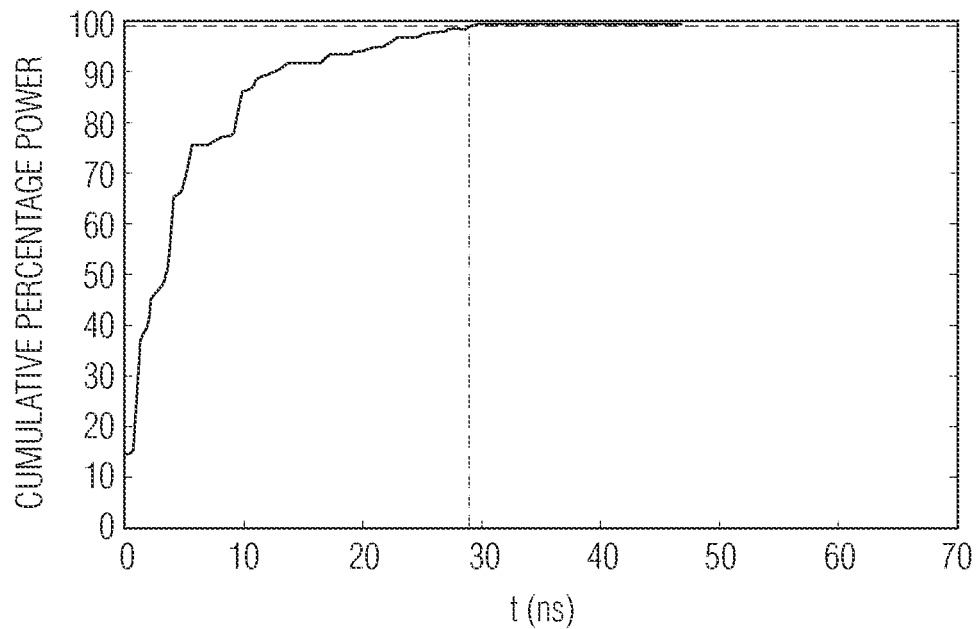
FIG. 2 illustrates determining appropriate length of the GI based on percentage of total channel power.

In a preferred embodiment, the appropriate length of the GI is determined from the time domain estimate (impulse response) of the channel. Given the time domain channel estimate, a preferred embodiment chooses the GI length that contains a predetermined percentage of the channel power. For example, FIG. 2 illustrates a preferred embodiment of such a method. Assuming that it is desired that 99% of the channel power is contained within the GI, the appropriate length of the GI is found to be approximately 29 ns.

Figure 3:
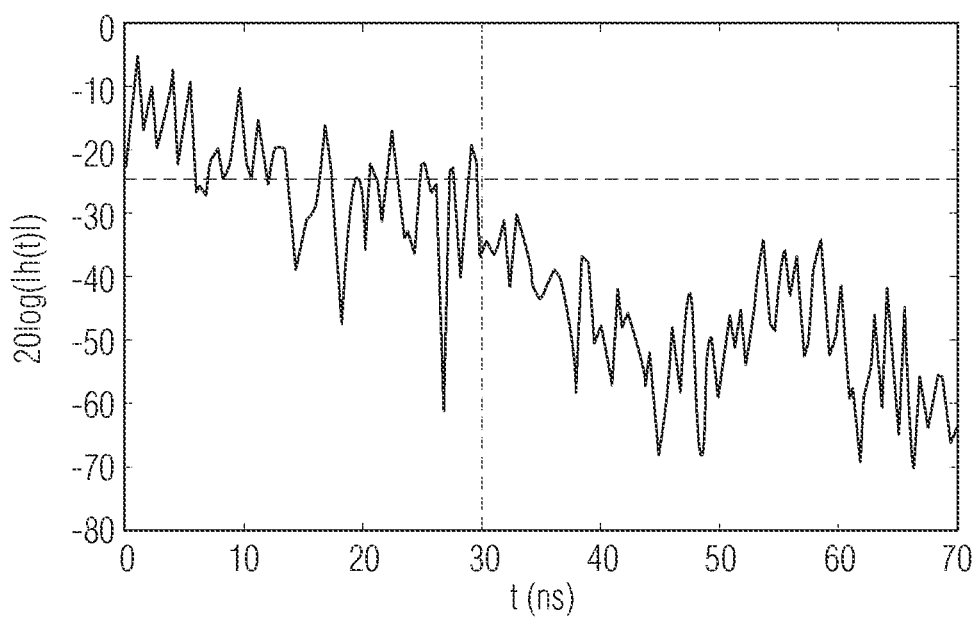
FIG. 3 illustrates determining the appropriate GI length using a threshold.

An alternative preferred embodiment of a simpler method selects the length of the GI based on a pre-specified threshold. FIG. 3 illustrates a preferred embodiment of this alternative method. Here, the threshold is chosen to be 20 dB below the peak value of the channel impulse response. The length of the GI is then selected such that all parts of the impulse response that have values larger than the threshold fall within the GI. It can be seen that (for the same channel) this method results in a GI length of approximately 30 ns.

Figure 4:
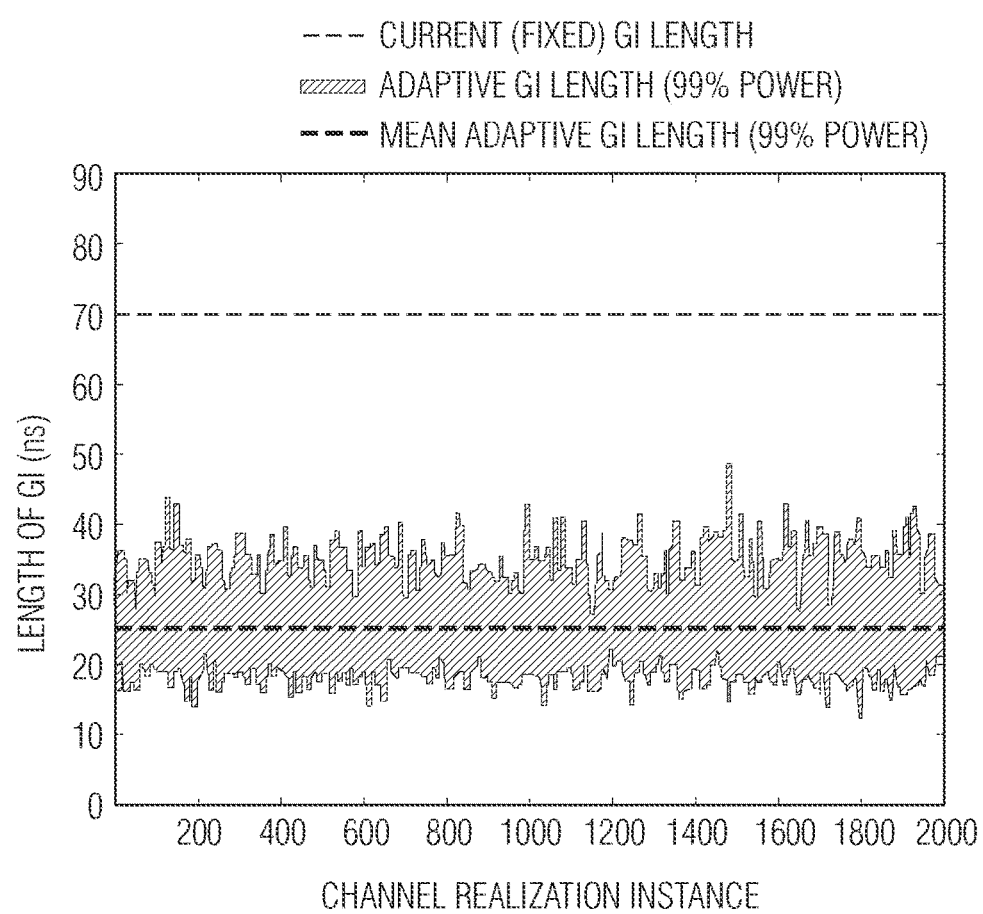
FIG. 4 illustrates GI length obtained from the 99% power method, for CM1 channel model.

To demonstrate the improvements in bandwidth efficiency, an example is provided using parameters similar to those of an MB-OFDM UWB system and the CM1 channel model. Improvement in bandwidth efficiency is similar for single carrier systems. Using the percentage power method (with 99% of the power), the average length of the required GI for 2000 realizations of the CM1 channel model is equal to 24.88 ns, see FIG. 4. This is in comparison with the fixed GI length in the MB-OFDM specifications of 70.08 ns. This means that by using the adaptive GI method, the bandwidth efficiency of this system is increased by a factor of (242.42+70.08)/(242.42+24.88)=1.17, which results in a 17% increase in data rates. For example, a data rate of 480 Mb/s can be increased to 560 Mb/s.

The system, apparatus, and method of the present invention improves the bandwidth efficiency of SCBT with GI systems, and is especially suitable for high rate communications, where multi-path can be significant, and bandwidth efficiency is very important.

The present invention is particularly attractive for use in 60 GHz systems due to very high data rates, as well as for the use in systems having different antenna gains for different applications.

Furthermore, this invention is especially attractive in standardization efforts, since it enables flexibility in receiver design.

While the preferred embodiments of the present invention have been illustrated and described, it will be understood by those skilled in the art that the system, apparatus and methods as described herein are illustrative and various changes and modifications may be made and equivalents may be substituted for elements thereof without departing from the true scope of the present invention. In addition, many modifications may be made to adapt the teachings of the present invention to a particular synchronizing situation without departing from its central scope. Therefore, it is intended that the present invention not be limited to the particular embodiments disclosed as the best mode contemplated for carrying out the present invention, but that the present invention include all embodiments falling within the scope of the claim appended hereto.

We claim:

1. A system for a Single Carrier Block Transmission having a block of symbols with length N, comprising:
    a transmitter configured to transmit a guard interval (GI) of a pre-determined length $N_{GI}$ before each block of symbols; and
    a receiver configured to remove the GI of the length $N_{GI}$ transmitted by the transmitter and received before each block of symbols by the receiver,
    wherein the transmitter periodically determines the length $N_{GI}$ of the GI based on an estimate of channel impulse response from received packets, with the length $N_{GI}$ of the GI being selected to contain a pre-determined cumulative percentage of channel power for the estimate of channel impulse response, and sends the length $N_{GI}$ to the receiver such that an impact of the GI on bandwidth efficiency is reduced.

2. A system for a Single Carrier Block Transmission having a block of symbols with length N, comprising:

a transmitter configured to transmit a guard interval (GI) of a pre-determined length $N_{GI}$ before each block of symbols; and a receiver configured to remove the GI of the length $N_{GI}$ transmitted by the transmitter and received before each block of symbols by the receiver, wherein the receiver periodically determines the length $N_{GI}$ of the GI based on an estimate of channel impulse response from received packets, with the length $N_{GI}$ of the GI being selected to contain a pre-determined cumulative percentage of channel power for the estimate of channel impulse response, and sends the length $N_{GI}$ to the transmitter such that an impact of the GI on bandwidth efficiency is reduced, wherein the receiver determines and sends to the transmitter the determined length $N_{GI}$ of the GI using at least one of a dedicated feedback channel and a field in an ACK or a return packet header sent over a normal channel therebetween.

3. The system of claim 2, wherein the receiver determines an appropriate length $N_{GI}$ of the GI as a function of observed channel impulse response length and further comprises a frequency domain equalization module that uses the estimate of channel impulse response to equalize received signal and detect transmitted data.

4. A method for Single Carrier Block Transmission having a block of symbols with length N, comprising:

periodically determining a length $N_{GI}$ by one of a transmitter and a receiver of the Single Carrier transmission by the transmitter using estimation of channel impulse response and the receiver using a technique selected from the group consisting of estimation of channel impulse response and design of the receiver;

sending the determined length to the respective receiver and transmitter as a length $N_{GI}$;

transmitting to the receiver a guard interval (GI) of the length $N_{GI}$ before each block;

removing the transmitted GI of the length $N_{GI}$ received before each block by the receiver; and exchanging between the receiver and the transmitter the determined length $N_{GI}$ of the GI using at least one of a dedicated feedback channel and a field in an ACK or a return packet header sent over a normal channel therebetween, wherein given an estimate of channel impulse response the length $N_{GI}$ of the GI is selected to contain a pre-determined cumulative percentage of channel power.

5. The method of claim 4, wherein when the receiver determines the length $N_{GI}$ of the GI as a function of observed channel impulse response length, providing a frequency domain equalization module that uses the estimate of channel impulse response to equalize received signal and detect transmitted data.

6. A receiver for a Single Carrier Block Transmission system having a block of symbols with length N, comprising:

a GI removal module that removes a GI of a pre-determined length $N_{GI}$ before each block received from a transmitter, wherein the receiver periodically determines the length $N_{GI}$ of the GI based on an estimate of channel impulse response from received packets, with the length $N_{GI}$ of the GI being selected to contain a pre-determined cumulative percentage of channel power for the estimate of channel impulse response, and sends the length $N_{GI}$ to the transmitter so as to reduce an impact of the GI on bandwidth efficiency; and a channel estimation module that estimates the channel impulse response and to include a GI length determination module that periodically determines the length $N_{GI}$ of the GI based on an estimate of the channel impulse response.

7. The receiver of claim 6, wherein the receiver sends to the transmitter the determined length $N_{GI}$ of the GI using at least one of a dedicated feedback channel and a field in an ACK or a return packet header sent over a normal channel therebetween.

8. The receiver of claim 6, wherein the receiver further comprises a frequency domain equalization module that uses the estimate of channel impulse response to equalize received signal and detect transmitted data.

* * * * *